(No Model.)

B. B. LEDERER.
BRACELET.

No. 319,273. Patented June 2, 1885.

WITNESSES:
C. H. Luther Jr
Jno. L. Coudron.

INVENTOR:
Benedict B. Lederer
¾ Joseph A. Miller & Co
Attys

UNITED STATES PATENT OFFICE.

BENEDICT B. LEDERER, OF PROVIDENCE, RHODE ISLAND.

BRACELET.

SPECIFICATION forming part of Letters Patent No. 319,273, dated June 2, 1885.

Application filed October 21, 1884. (No model.)

*To all whom it may concern:*

Be it known that I, BENEDICT B. LEDERER, of the city and county of Providence, and State of Rhode Island, have invented certain new and useful Improvements in Bracelets, of which the following is a full, clear, and exact description, reference being had to the accompanying drawings, forming a part of this specification.

My invention relates to that class of bracelets which are composed of two wings or sections united by a hinge and held in closed condition by a spring-clasp; and the object of my invention is to construct a bracelet of this class entirely without solder.

To the above object my invention consists in the peculiar and novel construction of the wings and the hinge, and also in the peculiar and novel construction and arrangement of the spring-clasp, as hereinafter described and claimed.

In order that my invention may be fully understood, I will proceed to describe it with reference to the accompanying drawings, in which—

Figure 1:
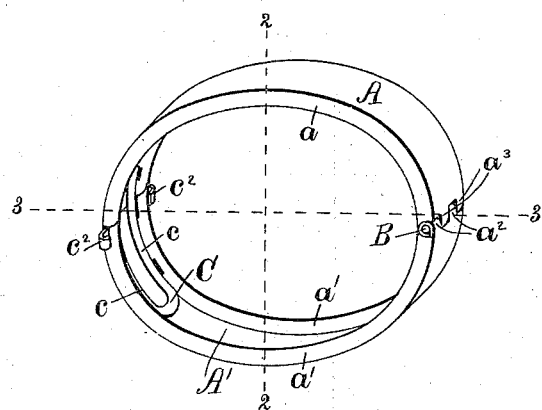
Figure 2:
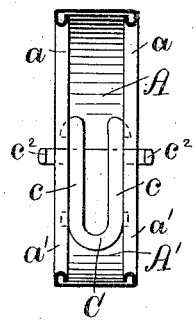
Figure 3:
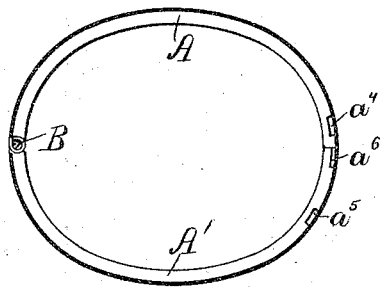
Figure 4:
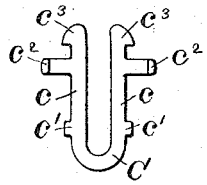

Figure 1 is a perspective view of my improved bracelet in closed condition. Fig. 2 is a lateral section of the same on the line 2 2 of Fig. 1. Fig. 3 is a longitudinal section of the same on the line 3 3 of Fig. 1. Fig. 4 is a detached view of the spring-clasp.

In the manufacture of bracelets, and, indeed, of jewelry of all kinds, the use of solder is highly objectionable, owing not only to the difficulty of concealing its presence, but also to the fact that the article is liable to more or less damage from the heat employed in manipulating the solder, and to the lack of strength in the solder itself; hence it is desirable to dispense with the use of solder, and this has been accomplished in certain portions of such articles. So far as I am aware, however, a complete bracelet has never heretofore been made without the use of solder. According to my invention no solder whatever is employed.

In the said drawings, A A′ designate the two wings or sections of the bracelet. B designates the hinge by which the two wings are united, and C designates the spring-clasp by which the wings are held in closed condition.

As shown in the drawings, the sections A A′ are each in the form of a flat semicircular strip. At each edge the strips are bent under, as is shown at $a$ $a'$, so as to form a bead upon the two under margins of each strip or wing. At the hinge end of each wing is formed by bending two hollow projections, $a^2$ $a^3$, through which is passed a pin, which thus pivots the two wings A A′ together after the fashion of a hinge. The bent margins $a$ of the wing A are each formed at a point near the free end of the wing with an aperture, $a^4$, such apertures extending only through the inner sides of the bent portions. The bent margins $a'$ of the wing A′ are each formed with two apertures, $a^5$ $a^6$, at points near the free end of the wing. Of the apertures $a^5$ $a^6$, the former extend only through the inner walls of the bent portions, while the latter extend entirely through both walls and sides. These apertures are designed to receive the spring-clasp, as will presently appear.

The spring-clasp C consists of a piece of resilient metal bent or otherwise formed in U shape, the two arms $c$ $c$ of which have each upon its outer side two projections, $c'$ $c^2$, the former projection, $c'$, being near the bend of the spring, and the latter being near the extremities thereof. At each extremity of the spring C is formed an outwardly-extending hook, $c^3$. The spring-catch is inserted between the curved margins $a'$ of the wing A′, as is shown in Fig. 2, the projections $c'$ entering the apertures $a^5$, while the projections $c^2$, which are longer than the projections $c'$, extend clear through and beyond the projections $a^6$, so as to project beyond the edges of the bracelet. The tendency of the extremities of the spring C is to separate, owing to the resilience of the spring, and hence when the bracelet is closed the hooks $c^3$ enter the apertures $a^4$.

The bracelet may be either of solid metal or of stock-plate, and may be ornamented in any suitable or desired manner. In closing the bracelet the curved advance edges of the hooks $c^3$ cause said hooks to move inward till the apertures $a^4$ are reached, whereupon the resilient action of the spring separates the extremities of the spring and throws the hooks into their apertures. In opening the bracelet pressure is applied upon the ends of the projections $c^2$, so as to force the extremities of the spring toward each other, and thus push the hooks $c^3$ out of the apertures $a^4$, whereupon the wings A A' may be drawn apart and the bracelet opened.

Thus it will be seen that no solder whatever is used in forming the bracelet.

The spring C is held is position by its projections $c'$, (of which more than one may be formed upon each arm of the spring, there being correspondingly additional apertures, $a^5$,) as such projections never move out of their apertures $a^5$. The projections $a^2 a^3$ are simply bent so as to surround the pivot-pin, and the ends of said pin being upset, so as to prevent its displacement.

It should be stated that the sections may have other than the flat band shape shown without departing from the spirit of my invention.

Having thus described my invention, I claim as new and desire to secure by Letters Patent—

1. The combination, with two hinged sections, A A', having the bent margins $a\ a'$, with their apertures $a^4\ a^5\ a^6$, of the spring C, having the arms $c\ c$, with their projections $c'\ c^2$, and hooks $c^3$, as described.

2. The combination, with the sections A A', having the bent margins $a\ a'$, with their apertures $a^4\ a^5\ a^6$, and the bent projections $a^2\ a^3$, of the pivot-pin surrounded by said projections, and the spring C, having the arms $c\ c$, with their projections $c'\ c^2$, and hooks $c^3$, substantially as and for the purposes stated.

BENEDICT B. LEDERER.

Witnesses:
J. A. MILLER, Jr.,
M. F. BLIGH.